(12) United States Patent
White et al.

(10) Patent No.: US 9,404,048 B2
(45) Date of Patent: Aug. 2, 2016

(54) CATALYSTS AND PROCESS FOR LIQUID HYDROCARBON FUEL PRODUCTION

(71) Applicant: Jacqueline Edwards-Henry, Starkville, MS (US)

(72) Inventors: Mark G. White, Spring Hill, FL (US); Samantha A. Ranaweera, Starkville, MS (US); William P. Henry

(73) Assignee: Mississippi State University, Mississippi State, MS (US)

( * ) Notice: Subject to any disclaimer, the term of this patent is extended or adjusted under 35 U.S.C. 154(b) by 0 days.

(21) Appl. No.: 14/544,988

(22) Filed: Mar. 12, 2015

(65) Prior Publication Data

US 2015/0275098 A1    Oct. 1, 2015

Related U.S. Application Data

(60) Provisional application No. 61/967,325, filed on Mar. 14, 2014.

(51) Int. Cl.
| | |
|---|---|
| *C07C 27/00* | (2006.01) |
| *C10G 2/00* | (2006.01) |
| *B01J 31/22* | (2006.01) |
| *B01J 21/08* | (2006.01) |
| *C01B 3/34* | (2006.01) |

(52) U.S. Cl.
CPC .................. *C10G 2/332* (2013.01); *B01J 21/08* (2013.01); *B01J 31/2295* (2013.01); *C01B 3/34* (2013.01); *C10G 2/33* (2013.01); *C10G 2/334* (2013.01); *B01J 2231/648* (2013.01); *B01J 2531/16* (2013.01); *B01J 2531/845* (2013.01); *B01J 2531/847* (2013.01); *C01B 2203/0205* (2013.01); *C01B 2203/062* (2013.01); *C01B 2203/1235* (2013.01)

(58) Field of Classification Search
CPC .. C10G 2/332; C01B 3/40; C01B 2203/1076; C01B 2203/2203; C01B 2203/062; C01B 2203/1052; C01B 2203/1082; B01J 31/2295; B01J 21/08; B01J 2531/845; B01J 2231/648; B01J 2531/16; B01J 2531/847
USPC .................................................. 518/700, 715
See application file for complete search history.

(56) References Cited

U.S. PATENT DOCUMENTS

| | | | | |
|---|---|---|---|---|
| 4,521,540 A | * | 6/1985 | Pierantozzi | ........... C07C 29/156 502/161 |
| 2011/0144219 A1 | * | 6/2011 | Kibby | ................... B01J 29/072 518/715 |

OTHER PUBLICATIONS

Maksimov et al., study of selective Fischer-Tropsch catalysts synthesized by the destruction of bimetallic carbonyl complexes on activated gamma-alumina support, (Hyperfine Interactions 57 (1990) 1987-1990).*

* cited by examiner

*Primary Examiner* — Jafar Parsa
(74) *Attorney, Agent, or Firm* — Lawrence Arthur Schemmel

(57) ABSTRACT

The present invention provides a novel process and system in which a mixture of carbon monoxide and hydrogen synthesis gas, or syngas, is converted into hydrocarbon mixtures composed of high quality distillates, gasoline components, and lower molecular weight gaseous olefins in one reactor or step. The invention utilizes a novel supported bimetallic ion complex catalyst for conversion, and provides methods of preparing such novel catalysts and use of the novel catalysts in the process and system of the invention.

25 Claims, 2 Drawing Sheets

CATALYSTS AND PROCESS FOR LIQUID HYDROCARBON FUEL PRODUCTION

CROSS-REFERENCE TO RELATED APPLICATION

This application claims priority from U.S. Provisional Patent Application Ser. No. 61/967,325 filed Mar. 14, 2014. The entirety of that provisional application is incorporated herein by reference.

STATEMENT OF GOVERNMENT SUPPORT

This invention was made with government support under Contract No. DE-FG36-06GO86025 awarded by the U.S. Department of Energy. The government may have certain rights in the invention.

FIELD OF THE INVENTION

This invention relates to the field of syngas conversion and more specifically to the field of converting synthesis gas to hydrocarbon mixtures and includes the novel catalysts involved in such conversion and the methods of preparing such catalysts.

BRIEF DESCRIPTION OF THE DRAWINGS

These drawings accompany the detailed description of the invention and are intended to illustrate further the invention and its advantages.

DISCUSSION

Figure 1:
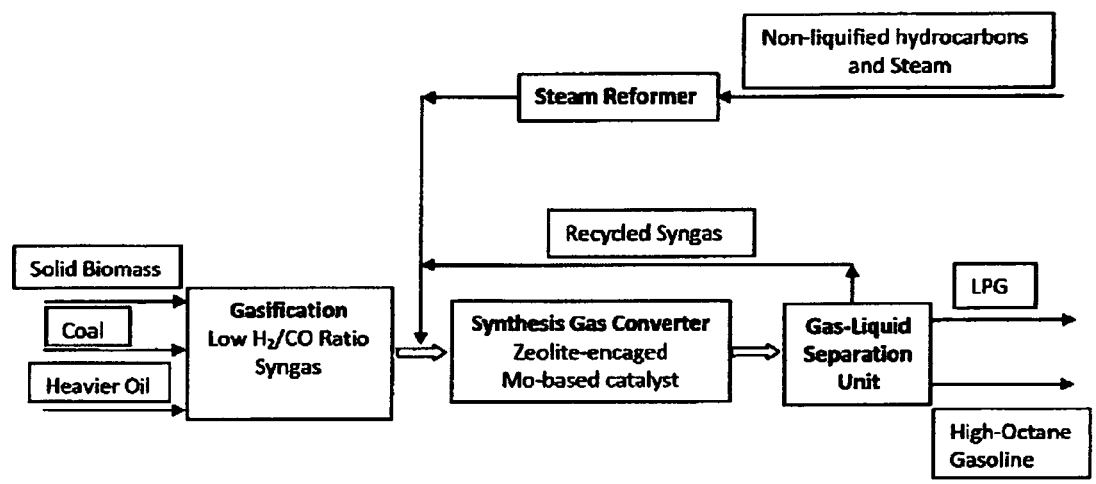
FIG. 1 is a graphical illustration of the overall process of the present invention.

The Fischer-Tropsch process involves a catalyzed chemical reaction whereby synthesis gas (or "syngas"), which is a mixture of carbon monoxide and hydrogen, is converted into liquid hydrocarbons with the aid of a catalyst. The catalysts generally contain, in addition to an active metal, a number of promoters as well as high surface area binders or supports such as silica, alumina, or zeolites. This process, which has been in commercial use for many years, produces higher hydrocarbon materials in the form of synthetic petroleum substitutes from coal, natural gas, heavier oil, or solid biomass for use as synthetic lubrication oil or synthetic fuel. The typical process involves multiple competing chemical reactions that subsequently result in both desirable products and undesirable byproducts.

Numerous patents exist that involve the Fischer-Tropsch synthesis process and catalysts used in such syntheses. However, the present invention discloses a novel process utilizing novel catalysts to produce high quality liquid hydrocarbons which, in several embodiments, is capable of doing so in only one step. Therefore, the process of these embodiments eliminates the necessity for further processing typical in these reactions and effectively eliminates one or more processing steps or reactors, thereby producing high quality hydrocarbon products via only one reactor.

The present invention discloses a novel process and system in which syngas is converted into high quality distillate components, gasoline components, and low molecular weight olefins in one reactor. Moreover, the process utilizes a novel, supported bimetallic catalyst for conversion.

The present invention provides, in various embodiments, for novel catalysts, methods of preparing such catalysts, and a novel process and system for utilizing these catalysts for converting low $H_2/CO$ molar ratio synthesis gas to hydrocarbon mixtures which may comprise distillates, high quality gasoline, and low molecular weight gaseous olefins. The invention is distinct and different from existing prior art and processes in many respects including, but not limited to: the catalysts use bimetallic complexes as the main active components for the reaction; the catalysts use silica, alumina, titania, or a zeolite (HZSM-5, Mordenite, MCM-22, MCM-41, H-Y-faujasite, H-beta, and the like) as the supporting material.

This invention demonstrates a process of converting a mixture of carbon monoxide and hydrogen (the synthesis gas, or syngas) into various hydrocarbon products. The origin of the synthesis gas may be from multiple sources well known in the art. By way of example, the sources could include but should not be limited to bioremewable sources such as biomass, grass, woody biomass, wastewater treatment sludges, industrial and municipal solid wastes and residual derived fuel thereof, and any type of lignocelluloses; synthesis gas derived from petroleum sources such as natural gas, light hydrocarbons, liquid hydrocarbons, or petroleum coke; or synthesis gas developed from a host of alternative sources of carbon such as coal, lignite, tar sands, shale oils, coal bed methane, and the hydrocarbon "ices" such as methane hydrate, mixtures of light gas hydrates, and the like.

With the foregoing and other objects, features, and advantages of the present invention that will become apparent hereinafter, the nature of the invention may be more clearly understood by reference to the following detailed description of embodiments and examples of the invention and to the appended claims.

DETAILED DESCRIPTION OF THE INVENTION

The subject matter of the present invention is described with specificity herein to meet statutory requirements. However, the description itself is not intended to necessarily limit the scope of claims. Rather, the claimed subject matter might be embodied in other ways to include different steps or combinations of steps similar to the ones described in this document, in conjunction with other present or future technologies.

The present invention discloses a process and system for the conversion of a mixture comprising carbon monoxide and hydrogen (such as in a synthesis gas) into various hydrocarbon products. The origin of the synthesis gas may be from a multitude of sources such as biorenewable sources including, but not limited to, biomass, grass, woody biomass, wastewater treatment sludges, industrial and municipal, municipal solid wastes and residual derived fuel thereof and any type of lignocelluloses. In addition, the source of the synthesis gas can be derived from petroleum sources such as natural gas, light hydrocarbons, liquid hydrocarbons, or petroleum coke. The synthesis gas can also be developed from a host of alternative sources of carbon such as coal, lignite, tar sands, shale oils, coal bed methane, and the hydrocarbon "ices" such as methane hydrate, and mixtures of light gas hydrates.

The present invention comprises solid catalysts for the selective conversion of a gas mixture containing carbon monoxide and hydrogen as the major components into liquid hydrocarbons. One novel element of this technology is the use of a bi-functional catalyst: (1) showing a bimetallic component (a conversion agent) that converts the CO and $H_2$ into reactive intermediates; and (2) showing an acidic, neutral, or basic component.

The catalytic conversion agent to accomplish the conversion of the present invention in a single catalyst bed is comprised of two functions which are inculcated into the catalyst particles: a CO conversion element which reduces the carbon monoxide into reactive intermediates; and a reactive intermediate conversion element which changes these reactive intermediates into hydrocarbons, carbon dioxide, and water.

The CO conversion element which reduces the carbon monoxide into the reactive intermediates can be chosen from a list of transition metals to include cobalt, iron, nickel, copper, manganese, molybdenum, ruthenium and pair-wise combinations of these metals/metal oxides. Other catalyst materials which may be added to promote the desired reactions include at least one metal modifier member of the elements of Groups IA and IIA of the Periodic Table, as referenced by S. R. Radel and M. H. Navidi, in Chemistry, West Publishing Company, New York, 1990, and mixtures of these elements, including but not limited to lithium, sodium, potassium, rubidium, cesium, beryllium, magnesium, calcium, strontium, and barium.

The present invention discloses novel catalysts, methods of preparing such catalysts, and a novel process and system utilizing these catalysts for converting low $H_2$/CO molar ratio synthesis gas to hydrocarbon mixtures which may comprise distillates, high quality gasoline, and/or low molecular weight gaseous olefins. The invention uses catalysts comprising homodinuclear and heterodinuclear complexes of cobalt, copper, iron, nickel, manganese, molybdenum, and ruthenium, as the main active components for the reaction. The catalysts use supports, including but not limited to silica, alumina, or a zeolite (HZSM-5, Mordenite, MCM-22, MCM-41, H-Y faujasite, H-beta, and the like), as the supporting material. Means for applying catalysts to supports is well known in the art. The active phase of the catalysts is composed of carburized/reduced bimetallic species or a non-zeolite, such as silica-alumina, heteropoly acid, silica, alumina, and titania. The process of the present embodiment allows for the removal of one or more reactors in the process of producing high quality gasoline or other hydrocarbon products and produces such products from syngas in only one step or reactor.

For example, as will be demonstrated herein, the novel catalysts have been shown to be suitable for synthesis using lower $H_2$/CO molar ratio syngas and comprise carburized/reduced bimetallic species, a zeolite, and at least one alkali metal as the promoter.

The process and system of the present invention converts syngas into high quality distillate and gasoline components in one reactor. In various embodiments, bimetallic complexes derived from either bis-triketonate ligands [MM'(triketonate)$_2$] or the Schiff base ligands of triketonates [MM'(daaen)] are deposited onto a support (silica, alumina, titania or zeolite) by batch impregnation. These complexes can be deposited as monolayers or multilayers depending on the conditions used. The ligands are then removed by calcination of the support with complex adsorbed to give metal oxides on the surface. Following activation, the catalyst thus generated promotes the conversion of syngas (CO+$H_2$) to hydrocarbons. The activity of the catalyst and the product selectivity can be varied by changing the metal complex, the loading, and/or the support.

One embodiment of the present invention is a process whereby syngas is converted into high quality hydrocarbon components, olefins and saturates, over a dinuclear cobalt catalyst on silica support. Another embodiment of the present invention is a process whereby syngas in converted into high quality distillate and gasoline hydrocarbon components over a copper-cobalt on silica catalyst. In yet another embodiment, the metal function can be nickel-cobalt on silica to produce a catalyst which converts the synthesis gas mainly to a product mixture containing distillates and gasoline fractions.

Figure 2:
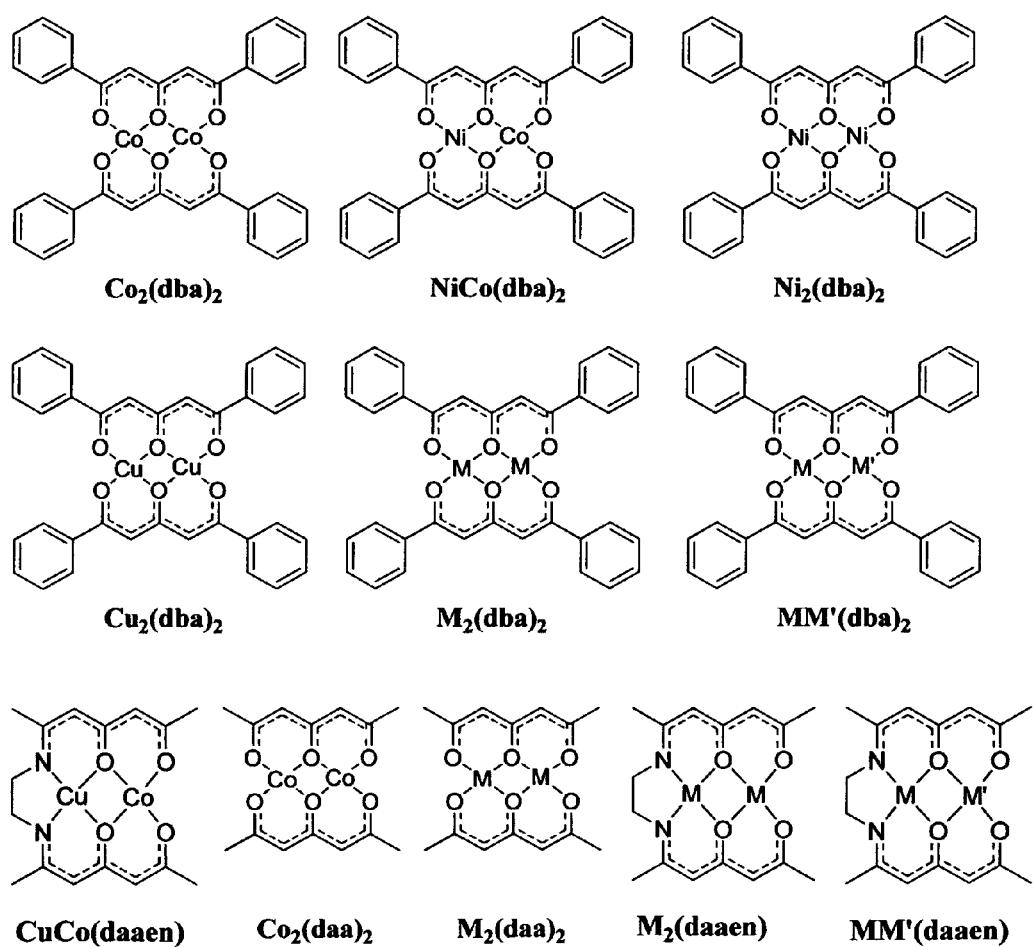
FIG. 2 is a list of drawings that illustrate the dinuclear metal complexes used as catalyst precursors, wherein M=Cu, Co, Fe, Ni, Mo, Ru, or Mn; and wherein M'=Cu, Co, Fe, Ni, Mo, Ru, or Mn.

Illustrative examples of dinuclear metal complexes that can used in this catalyst synthesis are shown in FIG. 2. The means of stabilizing the dinuclear metal ions is well known in the art; however, by way of example, the ligands used to stabilize the dinuclear metal ions were: bis(heptane-2,4,6-trionato), (daa)$_2$; bis(1,5-diphenyl-1,3,5-pentanetrionato), (dba)$_2$; and [6,11-dimethyl-7,10-diazahexadeca-5,11-diene-2,4,13,15-tetranato(4-)-N7N10O4O13; O2O4O13O15], (daaen). From these three ligands the following dinuclear metal complexes can be fabricated: Co$_2$(dba)$_2$; Co$_2$(daa)$_2$; CuCo(daaen); NiCo(dba)$_2$; and Ni$_2$(dba)$_2$. Details of the syntheses of these metal complexes are shown in: Samantha Ranaweera, Ph. D. dissertation, "Synthesis, Characterization, and Catalytic Activity of Silica Supported Homo- and Heterodinuclear Metal Complexes", Mississippi State University, Department of Chemistry, Aug. 11, 2012; R. L. Lindvedt, L. L. Borer, D. P. Murtha, J. M. Kuszaj, and M. D. Glick "Synthesis, Structure, and Magnetism of Polynuclear Chelates. Bis(1,3,5-triketonato)dinickel(II) Chelates" Inorg. Chem. 1974, 13(1), pp. 18-26; G. E. Buono-Core, M. Tejos, G. Cabello, N. Guzman and R. H. Hill "Photochemical Deposition of NiCoO$_x$ Thin Films from Ni/Co HeteronuclearTriketonate Complexes" Mater. Chem. Phys. 2006, 96, pp. 98-102.

Turning back to the figures, FIG. 1 illustrates graphically the overall process of the present invention. Solid biomass, municipal solid waste and refuse derived fuel, coal, and/or heavier oil is gasified in processes well known in the art to form syngas. The gasified syngas is exposed to a dinuclear metal based catalyst, causing a chemical reaction to occur converting at least a portion of the syngas. The product that results is a combination of gas and liquid. The liquid products are separated using a gas-liquid separation unit and comprise the high quality end product which may be a liquid hydrocarbon. The gas products can be reintroduced to the catalyst for reprocessing. In one or more embodiments, the gas products are fed to and processed through a steam reformer and returned to the single reactor system.

The invention is further clarified by the following examples, which are intended to be purely illustrative demonstrations of the invention's utility. Other embodiments of the invention will be apparent to those skilled in the art from a consideration of this specification or practice of the invention as disclosed herein. All percentages are on a mole percent basis and selectivities are on a carbon atom percent basis, unless noted otherwise.

Modern catalyst design and synthesis acknowledges the structure/properties relationships established for the reaction (s) of interest. In general, different orientations of metal atoms in a small metal crystal are known to catalyze different reactions. For example, small ensembles of metal atoms are known to catalyze the simple hydrogenation of olefins to saturates without any rearrangement reactions occurring. Conversely, sufficiently larger ensembles of metal atoms catalyze not only the hydrogenation of the olefins but also can catalyze the oligomerization of the olefins into a larger olefin. This is but one example how the catalyst structure influences the catalytic properties.

For the present case, the reaction between carbon monoxide (CO) and hydrogen ($H_2$) for the production of hydrocarbons is known to occur over Co metal and metal oxide surfaces. In the case of the commercial, Fischer-Tropsch catalyst, the large ensembles of Co atoms produce a distribution of hydrocarbons having carbon numbers ranging from 1 to greater than 25. This distribution of hydrocarbons is generally predicted by the Schulz-Flory equation, an equation that is often used to characterize hydrocarbon polymers, such as polyethylene. This wide distribution of molecular weights is unsuitable as a fuel, so the mixture is often separated into a light and a heavy fraction, and the heavy fraction must processed further by cracking into a range of hydrocarbons having the same boiling range, ergo average molecular weights, as gasoline and diesel.

In various embodiments, a catalyst synthesis strategy is disclosed to overcome this problem. Metal complexes having a small ensemble size (2-4 metal atoms) are synthesized using organic ligands to hold the metal atoms together as a rigid structure. These metal complexes act as building blocks which self-assemble onto the metal oxide, support surface in layers. These metal complexes then become secured to the surface by the organic ligands, vide supra, that hold the metal complexes together as the metal atoms form bonds to the surface oxide atoms of the support. The size of the hydrocarbon developed from the synthesis gas reaction depends upon the size of the metal ensemble. Thus, by design of the metal atom ensemble size and by the number of layers formed by the metal complexes on the support, the CO insertion reaction can be regulated to stop at a certain carbon number. This allows access to a range of molecular weights by building from one to two layers of these metal complexes. Subsequently, the metal ligands are removed by thermolysis so as to allow access of the reactants and intermediates to the metal atoms.

Example 1

$Co_2(dba)_2$/Silica Monolayer Synthesis $Co_2$/silica catalysts on small particles of fused silica were prepared by batch impregnation of $Co_2(dba)_2$ from dichloromethane (DCM) solution onto Cab-O-Sil™ (ACROS Organics, M-5 scintillation grade, 200 m²/g surface area). The loading was controlled by the ratio of metal complex to silica. Subsequent to impregnation, the silica with metal complex deposited was calcined in air at 400° C. for 3 h.

The $Co_2(dba)_2$/silica catalyst was prepared by dissolving 1 g of $Co_2(dba)_2$ complex in 0.4 L of DCM and then contacting this solution with 5 g of Cab-O-Sil™ with stirring for 24 h. The solvent was removed from the solid by evaporation under reduced pressure at room temperature. Then the catalyst was activated by heating at 400 degrees Celsius for 3 h. The cobalt loading was 3.5 wt % Co. This thermally-activated catalyst was reduced with 50% $H_2$ at 250 degrees Celsius for 2 h.

Example 2

$Co_2(dba)_2$/Silica Multilayer Synthesis

The $Co_2(dba)_2$/silica multilayer catalyst was prepared by dissolving 2.0 g of $Co_2(dba)_2$ complex in 0.4 L of DCM and then contacting this solution with 5 g of Cab-O-Sil™ with stirring for 24 h. The solvent was removed from the solid by evaporation under reduced pressure at room temperature. Then the catalyst was activated by heating at 400 degrees Celsius for 3 h. The cobalt loading was 6.7 wt % Co. This thermally-activated catalyst was reduced with 50% $H_2$ at 250 degrees Celsius for 2 h.

Example 3

$Co_2(daa)_2$/Silica Monolayer Synthesis

The $Co_2(daa)_2$/silica monolayer catalyst was prepared by dissolving 1.0 g of $Co_2(daa)_2$ complex in 0.4 L of DCM and then contacting this solution with 5 g of Cab-O-Sil™ with stirring for 24 h. The solvent was removed from the solid by evaporation under reduced pressure at room temperature. Then the catalyst was activated by heating at 400 degrees Celsius for 3 h. The cobalt loading was 5.0 wt % Co. This thermally-activated catalyst was reduced with 50% $H_2$ at 250 degrees Celsius for 2 h.

Example 4

CuCo(daaen)/Support Monolayer Synthesis

CuCo(daaen)/support catalysts were prepared by batch impregnation of CuCo(daaen) from DCM solution onto either 1) Cab-O-Sil™, 2) γ-alumina (Alfa Aesar, 200 m²/g surface area). Monolayer loading of the metal complex was achieved by dissolving CuCo(daaen) in DCM and stirring with the appropriate support for 24 h. The amount of complex adsorbed was monitored by UV-vis spectral changes of the treating solution. The support with complex adsorbed was separated by filtration and dried under vacuum. This was then calcined at 400° C. for 3 h. The CuCo(daaen)/silica catalyst was prepared by dissolving 1.00 g of CuCo(daaen) complex in 0.4 L of DCM and then contacting this solution with 5 g of Cab-O-Sil™ for 24 h. Then the catalyst was activated by heating at 400 degrees Celsius for 2 h. The resulting catalyst on Cab-O-Sil™ has a cobalt metal loading of 2.35% and a copper metal loading of 2.53%. The γ-alumina supported catalyst has a cobalt metal loading of 2.36% and a copper metal loading of 2.54%. This thermally-activated catalyst was reduced with 50% $H_2$ at 250 degrees Celsius for 2 h.

Example 5

CuCo(daaen)/Silica Multilayer Synthesis

The CuCo(daaen)/silica catalyst was prepared by dissolving 1.66 g of CuCo(daaen) complex in 0.4 L of DCM and then contacting this solution with 5 g of Cab-O-Sil™ for 24 h. Then the catalyst was activated by heating at 400 degrees Celsius for 2 h. The cobalt loading was 4.6 wt % Co. This thermally-activated catalyst (4.60 g) was reduced with 50% $H_2$ at 250 degrees Celsius for 2 h.

Example 6

$NiCo(dba)_2$/Silica Monolayer Synthesis $NiCo(dba)_2$/silica catalysts were prepared by batch impregnation of $NiCo(dba)_2$ from DCM solution onto Cab-O-Sil™. Approximate monolayer loading was achieved by dissolving $NiCo(dba)_2$ in DCM and stirring with Cab-O-Sil™ for 24 h. The amount of complex adsorbed was monitored by UV-vis spectral changes of the treating solution. The support with complex adsorbed was separated by filtration and dried under vacuum. This was then calcined at 400° C. for 3 h.

A detailed description of the preparation is as follows. 1.00 g of $NiCo(dba)_2$ was dissolved in 200 mL of DCM. 5.00 g of Cab-O-Sil™ was added and the mixture was stirred for 24 h. The Cab-O-Sil with $NiCo(dba)_2$ adsorbed was collected by filtration. The supported complex was then dried under vacuum to remove residual DCM. The Cab-O-Sil™ with nickel-cobalt complex supported was then calcined at 400° C. for 3 h. The resulting catalyst has a cobalt metal loading of 1.48% and a nickel metal loading of 1.47%.

The catalyst was activated by reducing with 50% $H_2$ at 250 degrees Celsius.

Example 7

$Co_2(dba)_2$/Silica Beads Multilayer Synthesis $Co_2$/silica catalysts on beads were prepared by batch impregnation of $Co_2(dba)_2$ from dichloromethane (DCM) solution onto silica beads; 1) Fuji Silysia Chemical Ltd., CARiACT Q-20C, 135 $m^2$/g surface area, 1.70-4.00 mm diameter, 20.9 nm average pore diameter; 2) PQ Corporation, 358 $m^2$/g surface area, [3-3.5 mm diameter]. The loading was controlled by the ratio of metal complex to silica. Subsequent to impregnation, the silica with metal complex deposited was calcined in air at 400° C. for 3 h.

A detailed description of the preparation is as follows. The description as given is for the support of dicobalt complex onto Fuji Silysia beads with the corresponding amounts for the PQ beads in square brackets. 1.35 g [3.58 g] of $Co_2(dba)_2$ was dissolved in 0.4 L of DCM. To this was added 5.00 g of silica beads and the mixture was allowed to stir for 24 h. The solvent was removed by slow evaporation of the solvent at approximately 30° C. The silica beads with dicobalt complex supported was then calcined in a muffle furnace at 400° C. for 3 h. The resulting catalyst has a cobalt metal loading of 4.69% [11.69%].

Batch Reactor Catalyst Testing

Example 8

Batch Reactor Catalyst Testing $Co_2$/Silica, Monolayer Catalyst

The Fisher-Tropsch reaction was performed at 350 degrees Celsius using the reduced catalyst in a Parr batch reactor. The reactor was charged with the $Co_2$/silica catalyst as prepared in Example 1. The reactor was closed and purged with nitrogen gas at atmospheric pressure and room temperature. Afterwards, the reactor was charged with 50% $H_2$/50% Ar at 250 degrees Celsius for 2 h. The reactor was cooled to room temperature and purged with a synthesis gas mixture (50 mol % CO and 50 mol % $H_2$). The temperature was increased rapidly to 350 degrees Celsius and the pressure change was recorded versus time.

Example 9

Batch Reactor Catalyst Testing $Co_2$/Silica, Multilayer Catalyst

The Fisher-Tropsch reaction was performed at 350 degrees Celsius using the reduced catalyst in a Parr batch reactor. The reactor was charged with the $Co_2$/silica catalyst as prepared in Example 2. The reactor was closed and purged with nitrogen gas at atmospheric pressure and room temperature. Afterwards, the reactor was charged with 50% $H_2$/50% Ar at 250 degrees Celsius for 2 h. The reactor was cooled to room temperature and purged with a synthesis gas mixture (50 mol % CO and 50 mol % $H_2$). The temperature was increased rapidly to 350 degrees Celsius and the pressure change was recorded versus time.

Example 10

Batch Reactor Catalyst Testing $Co_2$/Silica, Multilayer Catalyst

The Fisher-Tropsch reaction was performed at 350 degrees Celsius using the reduced catalyst in a Parr batch reactor. The reactor was charged with the $Co_2$/silica catalyst as prepared in Example 3. The reactor was closed and purged with nitrogen gas at room pressure and temperature. Afterwards, the reactor was charged with 50% $H_2$/50% Ar at 250 degrees Celsius for 2 h. The reactor was cooled to room temperature and purged with a synthesis gas mixture (50 mol % CO and 50 mol % $H_2$). The temperature was increased rapidly to 350 degrees Celsius and the pressure change was recorded versus time.

Example 11

Batch Reactor Catalyst Testing CuCo/Silica, Monolayer Catalyst

The Fisher-Tropsch reaction was performed at 350 degrees Celsius using the reduced catalyst in a Parr batch reactor. The reactor was charged with the CuCo/silica catalyst as prepared in Example 4. The reactor was closed and purged with nitrogen gas at atmospheric pressure and room temperature. Afterwards, the reactor was charged with 50% $H_2$/50% Ar at 250 degrees Celsius for 2 h. The reactor was cooled to room temperature and purged with a synthesis gas mixture (50 mol % CO and 50 mol % $H_2$). The temperature was increased rapidly to 350 degrees Celsius and the pressure change was recorded versus time.

Example 12

Batch Reactor Catalyst Testing CuCo/Silica, Multilayer Catalyst

The Fisher-Tropsch reaction was performed at 350 degrees Celsius using the reduced catalyst in a Parr batch reactor. The reactor was charged with the CuCo/silica catalyst as prepared in Example 5. The reactor was closed and purged with nitrogen gas at atmospheric pressure and room temperature. Afterwards, the reactor was charged with 50% $H_2$/50% Ar at 250 degrees Celsius for 2 h. The reactor was cooled to room temperature and purged with a synthesis gas mixture (50 mol % CO and 50 mol % $H_2$). The temperature was increased rapidly to 350 degrees Celsius and the pressure change was recorded versus time.

Example 13

Batch Reactor Catalyst Testing NiCo/Silica, Monolayer Catalyst

The Fisher-Tropsch reaction was performed at 350 degrees Celsius using the reduced catalyst in a Parr batch reactor. The reactor was charged with 4.6 g of NiCo catalyst as prepared in Example 6. The reactor was closed and purged with nitrogen gas at atmospheric pressure and room temperature. The reactor was charged with the thermally activated catalyst (4.60 g) and was reduced with 50% $H_2$/50% Ar at 250 degrees Celsius for 2 h. The reactor was cooled to room temperature and purged with a synthesis gas mixture (50 mol % CO and 50 mol % $H_2$). The temperature was increased rapidly to 350 degrees Celsius and the pressure change was recorded versus time.

These data of fractional pressure (P at time t/P at time=0) were used to calculate fractional conversion of hydrogen, the limiting reagent, using the stoichiometry for the Fischer-Tropsch reaction. These data of fractional hydrogen conversion were correlated with the product of reaction time, h, and the fractional weight of Co in the catalyst sample, g Co, assuming the reaction to be controlled by first order kinetics. Each of these data sets showed a linear relationship with the duration of reaction and the slopes of these curves were used to estimate the rate constants (Table 1). These rate constant data show that the most active catalyst was derived from multilayer $Co_2(dba)_2$/silica catalyst; whereas, the least active catalyst was derived from a monolayer of the same metal complex on silica. The catalysts derived from a monolayer of $NiCo(dba)_2$ or CuCo(daaen) on silica showed about the same activity (k=0.52 and 0.47 l/(h-g Co)). The catalyst derived from multiple layers of CuCo/daaen was slightly less active than the CuCo(daaen) monolayer catalyst, k=0.37 l/(h-g Co). The Co/silica catalyst derived from a monolayer of $Co_2(daa)_2$ showed a rate constant of 0.1 l/(h-g Co). The $Co_2(dba)_2$/silica multilayer and CuCo(daaen)/silica monolayer catalysts were examined further in a tubular-flow, bench-scale reactor.

TABLE 1

Summary of Batch Reactor Catalyst Testing; Isothermal Rate Constants

| | Catalyst | | | | | |
|---|---|---|---|---|---|---|
| | $Co_2(dba)_2$ monolayer | $Co_2(dba)_2$ multilayer | $Co_2(daa)_2$ monolayer | CuCo(daaen) monolayer | CuCo(daaen) multilayer | $NiCo(dba)_2$ monolayer |
| Rate Constants, 1/(h-g Co) | 0.033 | 0.99 | 0.1 | 0.47 | 0.37 | 0.52 |
| Example Number | 8 | 9 | 10 | 11 | 12 | 13 |

Tubular Flow Reactor Testing

Three catalysts were tested further in a tubular-flow, bench-scale reactor so as to characterize better the activity and products distribution obtained from these materials. The diameter of the reactor was ½ inch and its length was 1 meter. Gas mixtures of $CO/H_2/N_2$ (47%/:47%:6%) were metered to a fixed bed of powdered catalysts (~3-4 mm, 5 grams) at pressures to 1000 psig. After purging the reactor with $N_2$, each catalyst was reduced in an hydrogen-rich mixture (50% $H_2$/50% $N_2$) for 3 h at 300 degrees Celsius. Reactions were completed at 310, 325, and 350 degrees Celsius at a gas hourly space velocity of 600 l/h.

Example 14

Cu—Co/$SiO_2$ Derived from Monolayer Catalyst

The reaction temperature was 350 degrees Celsius, at a pressure of 910 psig, and a space-velocity of 600 l/h. The reaction time was 2 h.

Example 15

Cu—Co/$SiO_2$ Derived from Monolayer Catalyst

The reaction temperature was 350 degrees Celsius, at a pressure of 910 psig, and a space-velocity of 600 l/h. The reaction time was 26 h.

Example 16

Cu—Co/$SiO_2$ Derived from Monolayer Catalyst

The reaction temperature was 330 degrees Celsius, at a pressure of 910 psig, and a space-velocity of 600 l/h. The reaction time was 2 h.

Example 17

$Co_2$/$SiO_2$ Derived from Multilayer Catalyst

The reaction temperature was 350 degrees Celsius, at a pressure of 910 psig, and a space-velocity of 600 l/h. The reaction time was 76 h.

Example 18

$Co_2$/$SiO_2$ Derived from Multilayer Catalyst

The reaction temperature was 350 degrees Celsius, at a pressure of 750 psig, and a space-velocity of 600 l/h. The reaction time was 10 h.

Example 19

$Co_2$/$SiO_2$ Derived from Multilayer Catalyst

The reaction temperature was 330 degrees Celsius, at a pressure of 910 psig, and a space-velocity of 600 l/h. The reaction time was 10 h.

Example 20

$Co_2$/$SiO_2$ Derived from Multilayer Catalyst

The reaction temperature was 310 degrees Celsius, at a pressure of 910 psig, and a space-velocity of 600 l/h. The reaction time was 10 h.

Example 21

$Co_2$/$SiO_2$ Beads Derived from Multilayer Catalyst

The reaction temperature was 350 C, at a pressure of 910 psig, and a space-velocity of 600 l/h. The reaction time was 65 h.

The results of the tubular flow reactor testing are shown in Table 2.

TABLE 2

Results of Catalyst Testing in Bench-Scale Tubular Flow Reactor

| | Example Number | | | | | | | |
|---|---|---|---|---|---|---|---|---|
| | 14 | 15 | 16 | 17 | 18 | 19 | 20 | 21 |
| Catalysts | Cu—Co/SiO$_2$ | Cu—Co/SiO$_2$ | Cu—Co/SiO$_2$ | Co$_2$/SiO$_2$ | Co$_2$/SiO$_2$ | Co$_2$/SiO$_2$ | Co$_2$/SiO$_2$ | Co$_2$/Beads |
| Temperature, ° C. | 350 | 350 | 330 | 350 | 350 | 330 | 310 | 350 |
| Pressure, psig | 910 | 910 | 910 | 910 | 750 | 910 | 910 | 910 |
| Space-velocity, h$^{-1}$ | 600 | 600 | 600 | 600 | 600 | 600 | 600 | 600 |
| Duration of test, h | 2 | 26 | 2 | 76 | 10 | 10 | 10 | 65 |
| Conversion, CO | 89% | 77% | 56% | 99% | 97% | 92% | 89% | 99% |
| Selectivity, C$_1$-C$_3$ | 27% | 24% | 37% | 26% | 22% | 24% | 33% | 21% |
| Selectivity, C$_4$$^+$ | 35% | 25% | 17% | 67% | 65% | 70% | 62% | 42% |
| Selectivity, CO$_2$ | 38% | 51% | 46% | 7% | 13% | 7% | 5% | 37% |
| HC types | Olefins + sat. | Olefins + sat. | Olefins + sat. | Olefins + sat. | Olefins + sat. | Olefins + sat. | Olefins + sat. | Olefins + sat. |
| API gravity, ° API | | 66 | | 74 | | | | |
| specific gravity, | | 0.7160 | | 0.6895 | | | | |
| Reid VP, psia | | 1.7 | | 4.1 | | | | |
| Paraffins, wt % | | 3.2% | | 5.3% | | | | |
| Iso-paraffins, wt % | | 22.6% | | 17.7% | | | | |
| Aromatics, wt % | | 4.8% | | 10.2% | | | | |
| Napthenes, wt % | | 7.9% | | 7.8% | | | | |
| Olefins, wt % | | 36.2% | | 32.5% | | | | |
| Unknowns, wt % | | 24.2% | | 21.0% | | | | |
| ROH in water, wt % | | 0.8% | | | | | | |

Notes:
Cu—Co/Cab-O-Sil tests were stopped after 30 h because of excessive bed pressure drop.

This disclosure has for the first time described and fully characterized a novel process and system in which syngas is converted into high quality distillates, gasoline components, and lower molecular olefins in one reactor. The invention utilizes a novel supported bimetallic catalyst for conversion and provides methods of preparing such novel catalysts and use of the novel catalysts in the process and system of the invention.

The above detailed description is presented to enable any person skilled in the art to make and use the invention. Specific details have been disclosed to provide a comprehensive understanding of the present invention and are used for explanation of the information provided. These specific details, however, are not required to practice the invention, as is apparent to one skilled in the art. Descriptions of specific applications, analyses, and calculations are meant to serve only as representative examples. Various suitable changes, modifications, combinations, and equivalents to the preferred embodiments may be readily apparent to one skilled in the art and the general principles defined herein may be applicable to other embodiments and applications while still remaining within the spirit and scope of the invention. The claims and specification should not be construed to unduly narrow the complete scope of protection to which the present invention is entitled. It should also be understood that the figures are presented for example purposes only. There is no intention for the present invention to be limited to the embodiments shown and the invention is to be accorded the widest possible scope consistent with the principles and features disclosed herein.

What is claimed is:

1. A process for the production of hydrocarbon fuel products from synthesis gas, the process comprising:
    producing hydrocarbon fuel products in a single reactor system, wherein chemical reactions occur in the presence of a dinuclear metal ion based catalyst and
    wherein the dinuclear metal ion is from a metal ion complex where the cation is a +2 charged metal ion and the ligands are anionic organic compounds derived from triketonate anions.

2. The process of claim 1, wherein the synthesis gas is contacted in a Fischer-Tropsch reaction with the catalyst.

3. The process of claim 2, wherein the catalyst is a dinuclear metal ion complex supported on a support comprising a high-surface-area metal oxide and wherein the dinuclear metal ion complex comprises the active phase for syngas conversion.

4. The process of claim 3, wherein the dinuclear metal ion complex comprises a syngas conversion agent derived from a list of transition metal ions comprising cobalt, iron, nickel, copper, manganese, molybdenum, ruthenium, and pair-wise combinations of these metal ions or metal oxides.

5. The process of claim 4, wherein the dinuclear metal ion complex further comprises at least one metal modifier selected from the elements consisting of Groups 1A and 2A of the Periodic Table.

6. The process of claim 3, wherein the support comprises silica, alumina, titania, or a zeolite.

7. The process of claim 6, wherein the support comprises a zeolite which further comprises at least one member selected from the group consisting of the zeolite-based heterogeneous catalyst HZSM-5, Mordenite, MCM-22, MCM-41, H-Y-faujasite, and H-beta zeolites.

8. The process of claim 2, wherein the catalyst is derived from the decomposition of a dinuclear metal ion complex comprising an oxide represented by MO encaged in a zeolite, where M is at least one metal cation and O is at least one oxide anion, and wherein the decomposition product of the dinuclear metal ion complex comprises the catalytically active phase.

9. The process of claim 8, wherein the dinuclear metal ion complex further comprises a syngas conversion agent.

10. The process of claim 9, wherein the syngas conversion agent is derived from a list of transition metal ions comprising cobalt, iron, nickel, copper, manganese, molybdenum, ruthenium, and pair-wise combinations of these metal ions or metal oxides.

11. The process of claim 10, wherein the dinuclear metal ion complex further comprises at least one metal ion modifier selected from the elements consisting of Groups 1A and 2A of the Periodic Table and mixtures of the aforementioned elements.

12. The process of claim 8, wherein the zeolite comprises a support.

13. The process of claim 12, wherein the zeolite comprises one or more members selected from the group consisting of the zeolite-based heterogeneous catalyst HZSM-5, Mordenite, MCM-22, MCM-41, H-Y-faujasite, and H-beta zeolites.

14. The process of claim 1, wherein the hydrocarbon fuel products comprise liquid hydrocarbons and gas hydrocarbons and wherein the products are separated in a separation unit.

15. The process of claim 14, wherein the gas hydrocarbons are fed to and processed through a steam reformer and returned to the single reactor system.

16. The process of claim 14, wherein the process comprises a metal oxide support that comprises one or more members selected from the group consisting of silica alumina, silica, alumina, titania, and a zeolite.

17. The process of claim 16, wherein the catalyst is encaged in a zeolite support comprising one or more members selected from the group consisting of HZSM-5, Mordenite, MCM-22, MCM-41, H-Y-faujasite, and H-beta zeolites.

18. The process of claim 1, wherein the chemical reactions occur in the single reactor system and wherein the dinuclear metal ion based catalyst comprises at least one cobalt metal or metal oxide.

19. The process of claim 18, wherein the catalyst is supported on a support selected from the group consisting of silica alumina, silica, alumina, titania, and a zeolite.

20. The process of claim 19, wherein the chemical reactions produce hydrocarbon fuel products which further comprise liquid hydrocarbons and gas hydrocarbons and wherein the products are separated in a separation unit.

21. The process of claim 19, wherein the chemical reactions produce high quality distillates, gasoline components, and lower molecular weight gaseous olefins.

22. The process of claim 4, wherein the dinuclear metal ion complex catalysts are deposited onto the support as a monolayer.

23. The process of claim 4, wherein the dinuclear metal ion complex catalysts are deposited onto the support in multilayers.

24. The process of claim 3, wherein the support comprises silica.

25. The process of claim 24, wherein the catalyst comprises at least one cobalt metal or metal oxide.

* * * * *